Patented June 16, 1942

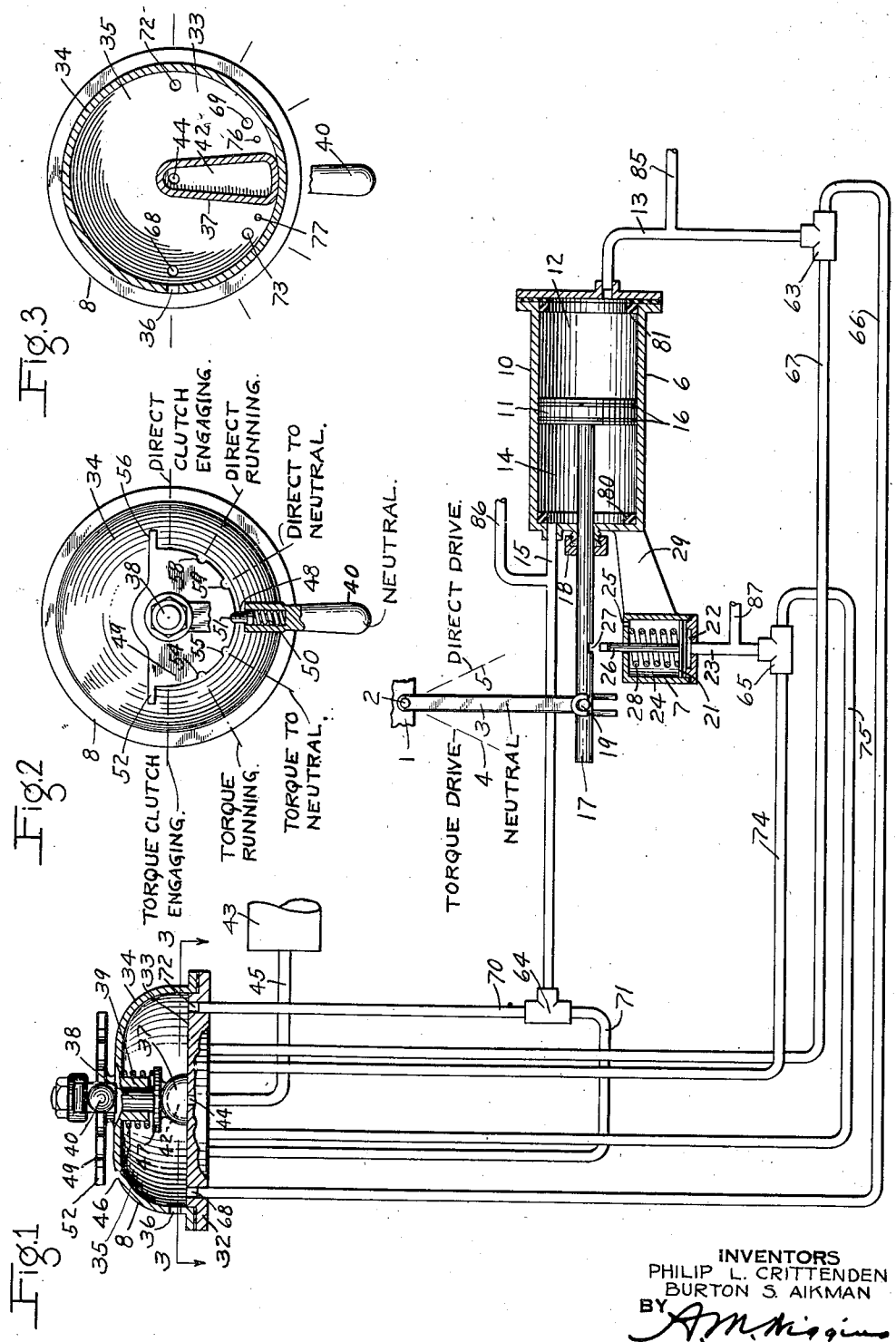

2,286,671

UNITED STATES PATENT OFFICE 2,286,671

CLUTCH CONTROL MEANS

Philip L. Crittenden, Edgewood, and Burton S. Aikman, Wilkinsburg, Pa., assignors to The Westinghouse Air Brake Company, Wilmerding, Pa., a corporation of Pennsylvania Application March 29, 1941, Serial No. 385,872

18 Claims. (Cl. 303—6)

This invention relates to controlling mechanisms and more particularly to remotely controlled power operated means for moving devices such as a clutch to different operating positions.

In certain railway vehicles propelled by internal combustion engines of the Diesel type a double friction clutch is provided which has a neutral position and at each side of the neutral position a drive position. In one of the drive positions, commonly known as torque drive, the clutch connects the engine to a hydraulic drive device through which power is transmitted from the engine to the drive wheels of the vehicle. In the other drive position, known as direct drive, the clutch provides a mechanical drive connection between the engine and drive wheels. The torque drive position is used for starting the vehicle and for accelerating same up to a certain speed. Then the clutch is shifted to the direct drive position which is used above the certain speed.

One object of the invention is the provision of a novel remote controlled power operated control mechanism for a multiple position device such as the clutch just described.

Another object of the invention is the provision of a remote controlled wholly pneumatic control mechanism for a multiple position device such as the clutch above described.

In clutches of the above type the clutch parts are maintained in each of their different positions by the action of springs through toggle arrangements. In order to shift the clutch to its different positions power must therefore be applied to overcome the toggles which then act to complete the shifting operation and to hold the parts in the desired position. After the shifting operation has been completed, it is not only unnecessary to maintain the shifting force on the clutch but it is also objectionable since it will maintain certain bearings in the clutch under an unnecessary load.

In the invention an engine operable by fluid under pressure constitutes the motive power to cause shifting of the clutch and another object of the invention is therefore to provide novel control means for the shifting engine whereby fluid under pressure may be supplied to the engine to effect movement of the clutch to one or another of its different positions and then released from the engine after the shifting has occurred so as thereby avoid unnecessary loading of any parts in the clutch and also to prevent loss or waste of fluid under pressure due to possible leakage from the shifting engine.

The engine employed for shifting the clutch to its different position embodies a piston means movable in a cylinder and having two extreme positions in the cylinder for positioning the clutch means in its two different drive positions and having an intermediate position for neutralizing or positioning the clutch in its neutral position.

Another object of the invention is the provision of a novel control mechanism for an engine such as just described adapted to positively stop the engine piston means in its neutral position when so desired and without any difficulty on the part of the operator.

Another object of the invention is the provision of a pneumatic remote control arrangement for a clutch such as above described which is relatively simple in construction, inexpensive to build, economical in the use of compressed air, and which is reliable and positive in operation.

Other objects and advantages will be apparent from the following more detailed description of the invention.

In the accompanying drawing; Fig. 1 is a diagrammatic view, mainly in section of a control mechanism embodying the invention; Fig. 2 is a plan view of a manually operated control device shown in Fig. 1; and Fig. 3 is a sectional view taken on the line 3—3 in Fig. 1.

Description

In the drawing the reference numeral 1 indicates a portion of a clutch housing which contains a double clutch (not shown). This clutch has a neutral position for disconnecting the propulsion engine of a vehicle from the drive wheels thereof and is movable in one direction from said neutral position to a torque drive position for connecting the engine to the drive wheels through a hydraulic power transmitting device. The clutch is also adapted to be moved from the neutral position in the opposite direction to a direct drive position to provide a direct mechanical drive connection between the engine and the vehicle drive wheels. Projecting from one side to the clutch housing is a shaft 2 which is rockable to different positions for shifting the double clutch to its different positions. For rocking the shaft 2, an arm 3 is secured thereto outside of the housing 1. This arm has a neutral position in which it is shown for positioning the double clutch in its neutral position and is rockable therefrom in a clockwise direction to a position indicated by a dash line 4 for conditioning the clutch to render the hydraulic drive device effective. The arm 3 is also rockable in a counterclockwise direction to a direct drive position indicated by a dash line 5 for conditioning the clutch to provide a direct drive connection between the propulsion engine and wheels of the vehicle.

The improved controlling mechanism embodying the invention constitutes means for positively moving a member such as the arm 3 to its different controlling positions and is therefore not limited in use to a double clutch device such as above described. A further showing of the parts of the clutch device and a more detailed description thereof are therefore not deemed essential to a clear and comprehensive understanding of the invention.

The control mechanism embodying the invention comprises a shifting cylinder 6, a pneumatic locking device 7, a manually operative control valve device 8, and a plurality of double check valve devices of conventional type which will be later described.

The shifting cylinder 6 comprises a casing 10 containing a reciprocatory piston 11 having at one side a chamber 12 connected to a pipe 13 and having at the opposite side a chamber 14 connected to a pipe 15. In operation the piston 11 is adapted to be subjected to the pressure of fluid either on one face or on the opposite only momentarily so that leakage past the piston is of no material importance. Due to this fact the piston is provided with conventional metallic packing rings 16 which are deemed sufficiently effective.

A piston rod 17 projects from one face of the piston through chamber 14 and a suitable packing gland 18 in one end of casing 10 into cooperating alignment with the clutch operating arm 3. Near the outer end of the rod 17 a pin 19 is secured to the rod and the clutch operating arm 3 is connected to this pin whereby movement of the piston rod 17 will rock said arm.

The pneumatic locking device 7 comprises a casing containing a piston 21 having at one side a chamber 22 open to a pipe 23 and having at the opposite side a chamber 24 which is open to the atmosphere through a breather port 25. The piston 21 is provided with a stem 26 which projects through chamber 24 and one end of the casing into alignment with the piston rod 17 which is provided with a notch 27, which is adapted to receive the end of said stem when the shifting piston 16 is in the neutral position shown. A spring 28 in chamber 24 acts on the piston 21 for normally urging it to the position shown and for thereby withdrawing the piston stem 26 from notch 27 to the position shown. The locking device 7 is preferably rigidly secured to the shifting cylinder 6 by means of a bracket 29 connecting said device and cylinder.

The manually operated control device 8 comprises a base section 32 having on one face a valve seat 33. A cover section 34 is secured to the base section 32 over the valve seat 33 and cooperates therewith to provide a valve chamber 35 which is in constant communication with the atmosphere through a vent port 36.

In chamber 35 there is a rotary valve 37 having one face in sliding contact with the valve seat 33 and which, as illustrated, is adapted to be turned on said seat through an arc of substantially 180°. This valve may be formed integrally with or be operatively connected to a shaft or stem 38 which is arranged in coaxial relation with the seat 33 and which is mounted to turn in a suitable bearing 39 provided through the cover section 34. The shaft 38 extends beyond the top of the cover section 34 and to its outer end is connected a handle 40 through the medium of which an operator may turn the rotary valve 37 to its different controlling positions which will be hereinafter explained.

It will be noted that the rotary valve 37 is relatively long and narrow and shaped somewhat like the segment of a circle and extends from near the axis of the seat or from adjacent one side of the operating shaft 38 to adjacent the periphery of the seat. The rotary valve 37 therefore covers only a portion of the seat over which it is adapted to be turned, and the uncovered portion of the seat is constantly open to chamber 35. In the seating face of the valve 37 and extending substantially from one end to the other is a cavity 42. The end of this cavity at the center of the valve seat is constantly open to a source of fluid pressure, such as a reservoir 43, through an axial port 44 provided in the seat and a pipe 45. The valve 37 is thus constantly subject to the pressure of fluid in cavity 42 which tends to lift said valve off its seat. To counteract such tendency and insure that the rotary valve will remain in contact with its seat a spring 46 is provided one end of which is backed up by the cover 34 while the other end bears against a seat 47 provided on the valve around the connection with the operation shaft 38.

Slidably mounted in a suitable bore in the handle 40 is a latch 48 which is movable in the direction of the operating shaft 38. The cover section 34 is provided with a quadrant 49 over which the latch is adapted to be moved as the handle 40 is turned to its different operating positions. A spring 50 in the handle acts on the latch 48 for urging same into contact with the quadrant 49.

The handle 40 has a neutral position, in which it is shown in Fig. 1, 2 and 3, for effecting operation of piston 11 in the shifting cylinder 6 and thereby of the clutch operating arm 3 to move the clutch to its neutral or non-driving position. The quadrant 49 has a notch 51 arranged to receive the latch 48 in this neutral position for defining same and for preventing accidental movement of the handle out of this position.

The handle 40 is adapted to be moved from the neutral position in one direction through an arc of substantially 90° to a torque clutch engaging position defined by engagement between the handle and a stop 52 provided on one end of the quadrant. Between the neutral position and this torque clutch engaging position are two other positions which the handle is adapted to assume at different times and which are indicated in Fig. 3 as torque running and torque to neutral. In the last two named positions at one side of the neutral position the quadrant 49 is provided with notches 54 and 55 for receiving the latch 48 to define said respective positions. The handle 40 is adapted to be moved in the opposite direction from neutral position through an arc of substantially 90° into contact with a stop 56 which is adapted to define a direct clutch engaging position between which and the neutral position are provided a direct running position and a direct to neutral position, as shown in Fig. 2. For defining the two latter positions the quadrant 49 is provided with notches 58 and 59, respectively, adapted to receive the latch 48.

Since the rotary valve 47 is connected to move with the handle 40 the rotary valve is therefore adapted to assume on the seat 33 different positions corresponding to those of the operating handle 40 with respect to the quadrant 49, as will be apparent. In Fig. 3 the different positions of the handle 40, indicated by legends in Fig. 2, are indicated by lines.

This improved control arrangement embodies three double check valves 63, 64 and 65 which permit the use of the manually operated controlled device 8 embodying the simple segmental rotary valve 37. Each of these double check valves is of conventional structure comprising a casing containing a valve (not shown) which is adapted to control communication between a side outlet and two oppositely arranged end outlets. The valve is adapted to be operated by fluid pressure supplied to one end outlet to open communication therebetween and the side outlet and to close communication between the side outlet and the other end outlet. When fluid pressure is supplied to the other end outlet, the valve is adapted to operate to reverse the communications just described. Since check valves of this type are so well known they are shown in the drawing merely in elevation for the purpose of simplicity.

The double check valve 63 has its side outlet connected to the pipe 13 while its end outlets are connected to pipes 66 and 67 which lead to the manually operative control device 8. The pipe 66 is connected to the valve seat 33 by a port 68 which is so arranged as to register with cavity 42 in the rotary valve 37 when the handle 40 is in the torque clutch engaging position. The pipe 67 is connected by a port 69 (Fig. 3) to the valve seat 33 in such a position as to register with cavity 42 in the rotary valve 37 when the handle 40 is in the direct to neutral position indicated in Fig. 2.

The double check valve 64 has its side outlet connected to pipe 15 while its end outlets are connected to pipes 70 and 71. The pipe 70 is connected by a port 72 to the valve seat 33, 180° from the port 68, and is thus adapted to register with the cavity 42 in the rotary valve 37 when the handle 40 is in the direct clutch engaging position indicated in Fig. 2. The pipe 71 is connected to the valve seat 33 through a port 73 so arranged as to register with cavity 42 in the rotary valve when in the torque to neutral position indicated in Fig. 2.

The double check valve 65 has its side outlet connected to pipe 23 leading to the pneumatic locking device 7, and its end outlets are connected to pipes 74 and 75. The pipe 74 is connected by a port 76 to the valve seat 33 alongside the port 69 so as to register with cavity 42 in the rotary valve in the direct to neutral position. The pipe 75 is connected by a port 77 to valve seat 33 for registry with cavity 42 in the rotary valve in the torque to neutral position.

*Operation*

In operation, let it be assumed that the vehicle provided with this improved control mechanism is at rest and that the handle 40 of the controlling valve device 8 is in its neutral position shown as a result of which all of the pipes just described are open past the rotary valve 37 to the valve chamber 35, as clearly shown in Fig. 3, and thereby void of fluid under pressure by virtue of the connection between said chamber and the atmosphere through port 36. Let it be further assumed that the reservoir 43 is charged with fluid under pressure in any desired manner and as a consequence the cavity 42 in the rotary valve 37 is charged with fluid under pressure through the pipe 45 and port 44.

With pipes 74 and 75 both open to the atmosphere the pipe 23 and thereby chamber 22 in the locking device 6 will be vented and the piston 21 will be held in the position shown by spring 28. The piston rod or latch 26 will therefore be occupying the position shown out of contact with the piston rod 17. Let it further be assumed that the shifting piston 11 and the clutch operating arm 3 are in their neutral positions shown and the clutch controlled thereby will therefore be in its neutral position disconnecting the propulsion engine on the vehicle from the drive wheels thereof.

If now it is desired to start the vehicle, the operator grasps the handle 40 and moves same from the neutral position in a clockwise direction to the torque clutch engaging position, indicated in Fig. 2. This operation of the handle 40 turns the rotary valve 37 from the position shown to a position in which cavity 42 registers with port 68 in the valve seat 33 so that fluid under pressure from the reservoir 43 supplied to said cavity will flow to pipe 66 and thence through the double check valve 63 and pipe 13 to piston chamber 12 in the shifting cylinder 6. It will be noted that the double check valve 63 acts at this time to disconnect the pipe 67 from the pipe 13 so that fluid under pressure cannot be vented through the pipe 67 to the rotary valve chamber 35 and thus to the atmosphere with the handle 40 in the torque clutch engaging position.

The pressure of fluid thus obtained in the shifting piston chamber 12 acts on the piston 11 to effect movement thereof in the direction of the left hand into contact with a cushioning ring 89. This movement of piston 11 transmitted through the piston rod 17 acts to move the clutch arm 3 from its neutral position shown to its torque drive position indicated by the line 4 for thereby operating the clutch controlled by said arm to its torque drive position in which power from the propulsion engine on the vehicle is transmitted to the driving wheels through the hydraulic drive device, above described.

As before described, the clutch with which this control mechanism is particularly adapted to be associated embodies spring actuated toggles which must be pushed past dead center and which then operate to complete the shifting of the clutch and to hold same in the desired position. As a result only a portion of the stroke of the shifting piston 11 from the neutral position shown toward the cushion 89 is required to push the toggles past dead center at which time the force opposing the pressure of fluid on piston 11 is suddenly reduced and said piston continues through the remainder of its stroke substantially unopposed. The cushion 89 engageable by the piston 11 at the end of its stroke is therefore adapted to prevent the development of excessive and possible damaging shock in the shifting cylinder.

The supply of fluid under pressure to the shifting cylinder piston chamber 12 for moving the clutch to its torque drive position need only be momentary, as will be apparent. To prevent unnecessary loss of fluid under pressure by possible leakage past the piston 11 and further, to prevent undue and unnecessary load on certain bearings in the clutch device after the shifting has been effected, the operating handle 40 is adapted to be moved from the torque clutch engaging position to the torque running position indicated in Fig. 2. In torque running position the port 68 open to pipe 66 is uncovered by the rotary valve 37 and opened to the valve chamber 35 and thence to the atmosphere through passage 36 whereupon the fluid under pressure is vented from the shifting piston chamber 12 to relieve the force of said piston on the clutch operating arm and thereby the clutch bearings and also to prevent loss of fluid under pressure by possible leakage past the piston 11.

The handle 40 and rotary valve 37 may be left in torque running position while accelerating the vehicle up to a certain desired speed by the transmission of power through the hydraulic drive device. After this speed is obtained, if it is desired to cut out the hydraulic drive device and provide the direct mechanical drive between the propelling engine and drive wheels, the handle 40 and thereby the rotatry valve 37 are turned from the torque running position to the direct clutch engaging position, indicated in Fig. 2.

In this latter position port 72 is open to cavity 42 in the rotary valve so that fluid under pressure supplied from the reservoir 43 to said cavity is adapted to flow to pipe 70 and thence through the double check valve 64 and pipe 15 to piston chamber 14 in the shifting cylinder 6. The fluid under pressure thus supplied to chamber 14 acts on the piston 11 to move same out of contact with the cushion 80 and to the opposite end of the cylinder into contact with a cushion 81, the piston chamber 12 being vented at this time through either pipe 67 or pipe 66 both of which are open to rotary valve chamber 35 and thereby to the atmosphere through port 36. This operation of the piston 11 moves the clutch arm 3 from the torque drive position indicated by the line 4 through the neutral position to the direct drive position indicated by the line 5 whereby the clutch is conditioned to provide the desired direct mechanical drive connection between the propelling engine and the drive wheels of the vehicle. The cushion 81 acts to resiliently stop movement of the piston 11 at this end of the cylinder in the same manner and for the same purpose as the cushion 80 at the opposite end.

With the operating handle 40 and rotary valve 37 in the direct clutch engaging position, piston chamber 14 in the shifting cylinder 5 is in communication with the reservoir 43, as above mentioned. This communication is however unnecessary and undesirable after the shifting has been completed. After completion of the shifting, the operator may therefore move the handle 40 and rotary valve 37 to the direct running position in which the port 72 is again opened to the rotary valve chamber 35 and thereby to atmosphere through port 36 so that fluid under pressure will be vented from the shifting piston chamber 14 thereby unloading the piston 11 and preventing the loss of fluid under pressure past said piston by leakage.

It will now be apparent that the torque clutch engaging position and the direct clutch engaging position are used for shifting of the clutch to a desired drive position but after such shifting has been effected, the handle 40 and thereby the rotary valve 37 are adapted to be moved to either the torque running position or the direct running position for removing the load of the shifting engine from the clutch shifting parts and for preventing loss of fluid under pressure by leakage through said engine.

In the operation so far described it will be noted that no fluid under pressure is supplied to pipes 67 and 71 and to pipes 74 and 75 except for a momentary and ineffective spurt during movement of the rotary valve between the different positions so far considered. Spring 28 acting on the piston 21 in the latching device 6 will therefore, during the operation described, maintain said piston and thereby the piston rod 26 in the position shown so that the piston rod 17 and thereby piston 11 are free to move to their different positions.

When it is desired to neutralize the clutch or to move same from its direct drive position to its neutral position for disconnecting the engine from the drive wheels of the vehicle, the handle 40 and thereby the rotary valve 37 are turned from the direct running position to the direct to neutral position indicated in Fig. 2. In this latter position cavity 42 in the rotary valve 37 registers with both ports 69 and 76 in the rotary valve seat so as to thereby supply fluid under pressure from the reservoir 43 through said valve to pipes 74 and 67.

The fluid pressure thus supplied to pipe 74 flows through the double check valve 65 to pipe 23 leading to piston chamber 22 in the latch device 7 and therein acts on the piston 21 to move same against the spring 28 and shift the piston rod 26 in the direction of and into contact with the shifting piston rod 17. At this time the shifting piston 11 is in contact with the cushion 81 so that the notch 27 in the piston rod 17 is disposed to the right-hand side of the latching piston rod 26, the latter being therefore moved into contact with the rod 17 adjacent its outer end.

At the same time as the latching piston rod 26 is moved outwardly, the fluid pressure supplied to pipe 67 flows through the double check valve 63 to pipe 13 and thence to piston chamber 12 and therein acts on the shifting piston 11 to effect movement thereof in the direction of the left-hand. This movement of the piston 11 continues until the notch 27 becomes aligned with the latching piston rod 26 at which time said rod is pushed into said notch by the pressure of fluid acting on the latching piston 21 so as to thereby secure the shifting piston 11 and the rod 17 against movement past its neutral position shown. The shifting piston 11 is thus operated to rock the arm 3 to move the clutch from the direct drive position to the neutral position, the locking device 6 acting positively to define the neutral position and to prevent movement of the clutch past the neutral position.

After the clutch is thus returned to its neutral position, it is intended that the operator move the handle 40 and thereby the rotary valve 37 from the direct to the neutral position indicated in Fig. 2, to thereby cut off the supply of fluid under pressure to pipes 74 and 67 and to vent said pipes to the atmosphere through the rotary valve chamber 45. By this operation fluid under pressure will be supplied to the locking device 7 and to chamber 12 in the shifting cylinder 5 only as long as required to obtain the desired neutralizing of the clutch and then such supply will be cut off so as to prevent the loss of fluid under pressure by leakage through said device and cylinder.

It will be noted in Fig. 3 that port 76 through which fluid under pressure is adapted to be released from the locking device 7 is relatively small as compared to port 69 through which the fluid pressure is released from the shifting cylinder chamber 12 when the handle 40 is moved to the neutral position. The purpose of this is to delay movement of the latching piston rod 26 out of notch 37 in the shifting piston rod 17 until the pressure of fluid on the shifting piston 11 is reduced to such a low degree that said piston will not operate to shift the clutch out of neutral position against the opposing action of the clutch toggles.

Before the speed of the vehicle is increased to the desired degree for direct drive with the handle 40 in torque running position, it may be desired to disconnect the propelling engine from the drive wheels in order to permit the vehicle to be stopped. In this case the handle 40 and thereby rotary valve 37 are moved from the torque running position to the torque to neutral position in which fluid under pressure is supplied through the cavity 42 in the rotary valve 37 to pipes 71 and 75.

The pressure of fluid thus supplied to pipe 75 is transmitted through the double check valve 65 to the locking cylinder device 7 for effecting operation thereof to move the piston rod 26 outwardly into engagement with the shifting piston rod 17 in the same manner as above described. The fluid pressure supplied to pipe 71 flows through the double check valve 64 to pipe 15 and thence to chamber 14 at the left-hand face of the shifting piston 11 and effects movement thereof in the direction of the right-hand. The piston 11 continues to move in this direction until arrested in neutral position by the locking piston rod 26 entering the notch 27 in the rod 17, so as to limit the movement of the clutch operating arm 3 from the torque drive position to the neutral position shown. The clutch is thus shifted from its torque drive position to its neutral position which disconnects the propelling engine from the drive wheels.

After the clutch is thus neutralized, it is intended that the operator shall move the handle 40 and rotary valve 37 to neutral position shown for thereby disconnecting pipes 71 and 75 from cavity 42 and opening same to the rotary valve chamber 35 and thereby to the atmosphere through port 36 so as to release the pressure on the locking device and shifting piston 11 and also to prevent the loss of fluid under pressure by leakage through said device and past said piston. The port 77 in the rotary valve seat is smaller than port 73 so as to delay the release of fluid under pressure from the locking device 7 with respect to the release of fluid under pressure from the shifting cylinder 6 when the operating handle 40 is moved to the neutral position, for the same reason that port 76 is smaller than port 69, as above described.

It will now be apparent that the operating arm 3 and thus the clutch controlled thereby is adapted to be moved to either the torque drive position, direct drive position or to neutral position by the shifting piston 11 depending upon which face of said piston is subjected to the pressure of fluid and whether or not the locking device 7 is effective or ineffective as controlled by the position of the manually operative valve device 8. For effecting movement of the arm 3 to one of the drive positions or the other of the drive positions one or the other of the clutch engaging positions of the controller device 8 is employed for supplying fluid under pressure to the cylinder device 6. For neutralizing the arm 3 and clutch controlled thereby either the torque to neutral position or the direct to neutral position is employed for supplying fluid under pressure to the shifting cylinder 6 and locking device 7.

These positions for causing engagement of the clutch and for neutralizing same are adapted to be used only momentarily following which either one or the other of the running positions, depending upon the position of the clutch, or the neutral position is adapted to be used, in all of which the supply of fluid under pressure to the shifting cylinder 6 and locking device 7 is cut off. The amount of fluid pressure required for operating this improved mechanism is thus limited substantially to the displacement of the shifting piston 11 and locking piston 21 since the operating valve 8 is not allowed to remain in a position in which the shifting cylinder 5 and locking device 6 are in communication with the reservoir 43. Any loss of fluid under pressure through the shifting cylinder 6 and locking device 7 by leakage is thus of little consequence and has no material effect upon the consumption of fluid pressure by the arrangement.

The shifting cylinder 6 and locking device 7 must be located in proximity to the operating arm 4 as will be apparent, but the manually operated control device 8 may be located anywhere on the vehicle convenient for operation by the operator and may be connected to the shifting device 6 and locking device 7 by suitable piping. This purely pneumatic control of a shifting lever or the like is therefore particularly adapted for remote control. The arrangement is simple in construction and relatively inexpensive to build, and regardless of the disposition of the various parts with respect to each other is reliable in operation.

It will be apparent that the desired positive shifting of the clutch to either of its drive positions or to neutral position is effected by a mere proper positioning of the operating handle 40 of the valve device 8. No complicated manipulation of or instruction for the operation of this device is required.

Certain vehicles are provided with more than one propulsion engine and therefore with more than one three position clutch, and it is desired in such a case that the clutches be operated in unison to corresponding positions. Moreover, two or more vehicles of this type may be coupled in a train and it is desired that the several clutch devices on the several vehicles be operated in unison under the control of the manually operative control device 7 at the leading end of the train. To accomplish this uniform operation, the shifting cylinder pipes 13 and 15 and the locking device pipe 23 may be provided with branches 85, 86 and 87, respectively, for connection with corresponding pipes leading to the shifting cylinders and locking devices associated with the other clutches whereby the several shifting cylinders and locking devices on the vehicle or train of vehicles will function in unison.

*Summary*

From the above description it will now be apparent that the improved control mechanism provides for positive, selective control of the positioning of arm 3 and thereby of the clutch device in any one of its three different positions in accordance with the position to which the handle 40 of the control device 8 is moved by the operator. The mechanism is fully pneumatic and so designed as to be economical in the use of compressed air. The arrangement is relatively simple in structure, inexpensive to build, and reliable in operation and provides a simple and positive control of one or more shifting engines and locking devices which may be located on one vehicle or on a plurality of connected vehicles.

While only one illustrative embodiment of the invention has been shown and described in detail, it is not the intention to limit the scope to that embodiment or otherwise than by the terms of the appended claims.

Having now described our invention, what we claim as new and desire to secure by Letters Patent, is:

1. A control mechanism comprising movable abutment means having a neutral position and two other positions, one at each side of said neutral position, and being movable in the direction of one of said other positions upon a variation in fluid pressure in one chamber and in the direction of the other of said other positions upon a variation in pressure in another chamber, valve means having one position for effecting a variation in pressure in one of said chambers and another position for effecting a variation in pressure in the other chamber, and locking means operative upon a variation in fluid pressure to arrest said movable abutment means in said neutral position, said valve means in its last named position effecting a variation in pressure on said locking means.

2. A control mechanism comprising movable abutment means having a neutral position and two other positions one at either side of said neutral position and being movable in the direction of one of said other positions upon a variation in fluid pressure in one chamber and in the direction of the other of said other positions upon a variation in pressure in another chamber, valve means having one position for effecting a variation in pressure in one of said chambers and two other positions for effecting a variation in pressure in the other of said chambers, and locking means operative upon a variation in fluid pressure to arrest said movable abutment means in said neutral position, said valve means in one but not in the other of its said two other positions effecting a variation in pressure on said locking means.

3. A control mechanism comprising movable abutment means having a neutral position and two other positions one at either side of said neutral position and being movable in the direction of one of said other positions upon a variation in fluid pressure in one chamber and in the direction of the other of said other positions upon a variation in pressure in another chamber, valve means having one position for effecting a variation in pressure in one of said chambers and two other positions for effecting a variation in pressure in the other of said chambers, and locking means operative upon a variation in fluid pressure to secure said movable abutment means against movement from said neutral position, said locking means being ineffective when said movable abutment means is out of said neutral position, said valve means in one of its two last named positions effecting a variation in pressure on said locking means.

4. A control mechanism comprising movable abutment means having a neutral position and two other positions one at either side of said neutral position and being movable in the direction of one of said other positions upon a variation in fluid pressure in one chamber and in the direction of the other of said other positions upon a variation in pressure in another chamber, valve means having one position for effecting a variation in pressure in one of said chambers and two other positions for effecting a variation in pressure in the other of said chambers, a member movable with said abutment means, locking means operative upon a variation in pressure to interlock with said member in said neutral position of said abutment means for securing said abutment means against movement past said neutral position, said locking means being ineffective at both sides of said neutral position, said valve means in one of its two last named positions also effecting a variation in pressure on said locking means.

5. A control mechanism comprising movable abutment means having a neutral position and two other positions one at either side of said neutral position and being movable in the direction of one of said other positions upon a variation in fluid pressure in one chamber and in the direction of the other of said other positions upon a variation in pressure in another chamber, valve means having one position for effecting a variation in pressure in one of said chambers and two other positions for effecting a variation in pressure in the other of said chambers, a member associated with said movable abutment means and having a recess, a plunger movable into engagement with said member and arranged to enter said recess in said neutral position of said movable abutment means for securing same against movement out of neutral position, means operative upon a variation in fluid pressure to actuate said plunger, said valve means in one of its two last named positions also effecting a variation in pressure on the last named means.

6. A control mechanism comprising a cylinder, a reciprocatory piston means in said cylinder movable in the direction of one end of said cylinder upon a variation in pressure in one chamber and in the opposite direction upon a variation in pressure in another chamber, locking means associated with said cylinder and adapted to cooperate with said piston means in a neutral position thereof midway between the ends of said cylinder to secure said piston means against movement, actuating means operative upon a variation in fluid pressure to condition said locking means to cooperate with said piston means in said neutral position, and valve means having one position for supplying fluid under pressure to one of said chambers and another position for simultaneously supplying fluid under pressure to the other of said chambers and to said actuating means.

7. A control mechanism comprising a cylinder, a reciprocatory piston means in said cylinder movable in the direction of one end of said cylinder upon a variation in pressure in one chamber and in the opposite direction upon a variation in pressure in another chamber, valve means having one position for effecting a variation in pressure in one of said chambers and another position for effecting a variation in pressure in the other of said chambers, a rod secured to said piston means for movement therewith, locking means arranged to interlock said rod in a neutral position of said piston mid-way between the ends of said cylinder for holding said piston means against movement, actuating means operative upon a variation in fluid pressure for operating said locking means, said valve means in one of its positions effecting a variation in fluid pressure on said actuating means.

8. A control mechanism comprising a cylinder, a reciprocatory piston means in said cylinder movable in the direction of one end of said cylinder upon a variation in pressure in one chamber and in the opposite direction upon a variation in pressure in another chamber, valve means having one position for effecting a variation in pressure in one of said chambers and another position for effecting a variation in pressure in the other of said chambers, a rod secured to said piston for movement therewith and having a notch, a plunger movable into engagement with said rod and adapted to enter said notch when said piston means is in a neutral position mid-way between the ends of said cylinder for securing said piston means against movement, means operative upon a variation in fluid pressure for moving said plunger into engagement with said rod, said valve means in one of its two positions effecting a variation in fluid pressure on said actuating means.

9. A control mechanism comprising a cylinder, a reciprocatory piston means in said cylinder movable in the direction of one end of said cylinder upon the supply of fluid under pressure to a chamber at one side of said piston means and movable in the opposite direction upon the supply of fluid under pressure to a chamber at the opposite side of said piston means, valve means having one position for supplying fluid under pressure to one of said chambers and another position for supplying fluid under pressure to the other of said chambers, a member movable with said movable abutment means, locking means adapted to cooperate with said member in a neutral position thereof mid-way between the ends of said cylinder for securing said piston means against movement, a piston adapted to be operated by fluid under pressure for actuating said locking means, said valve means in its last named position being operative to also supply fluid under pressure to said piston to actuate same.

10. A control mechanism comprising a cylinder, a piston therein, a rod secured to said piston and extending through one end of said cylinder, a chamber in said cylinder at either side of said piston, said piston being movable by fluid under pressure supplied to one of said chambers in the direction of one end of said cylinder and to the other of said chambers in the direction of the other end of said cylinder, a locking device secured to said cylinder and comprising a member adapted to be moved into engagement with said rod, means associated with said rod adapted to cooperate with said member in a neutral position of said piston mid-way between the ends of said cylinder for securing said piston against movement, said locking device further comprising a locking piston adapted to be operated by fluid under pressure to move said member into engagement with said rod, and a spring operative on said member for moving same out of engagement with said rod, and valve means having one position for supplying fluid under pressure to one of said chambers and at the same time venting the other of said chambers and venting fluid under pressure from said locking piston, said valve means having another position for supplying fluid under pressure to the last named chamber and for venting the other chamber and for simultaneously supplying fluid under pressure to said locking piston for actuating same.

11. A control mechanism comprising a cylinder, a reciprocatory piston means in said cylinder movable in the direction of one end of said cylinder upon a variation in pressure in one chamber and in the opposite direction upon a variation in pressure in another chamber, locking means associated with said cylinder and arranged to cooperate with said piston means only in a neutral position thereof mid-way between the ends of said cylinder for securing said piston means against movement, valve means having a normal position for equalizing the fluid pressures in said chambers and being movable therefrom to another position for connecting one of said chambers to a source of fluid pressure to effect a variation in pressure in said one chamber for effecting movement of said piston means in the direction of one end of said cylinder, said valve means having a third position intermediate the two above named positions for equalizing the fluid pressures on the opposite faces of said piston means, said valve means being movable to still another position between said third and the first named positions for connecting the other of said chambers and said locking means to said source of fluid pressure.

12. A control mechanism comprising in combination with a source of fluid pressure, a cylinder, a reciprocatory piston means in said cylinder having at one side a chamber adapted to be connected to said source of fluid pressure for effecting movement of said piston means in the direction of one end of said cylinder and having a chamber at the opposite side adapted to be connected to said source of fluid pressure for effecting movement of said piston means in the direction of the opposite end of said cylinder, locking means associated with said cylinder and arranged to cooperate with said piston means only in a position thereof substantially mid-way between the ends of said cylinder for securing same against movement, and valve means for controlling communication between said source of fluid pressure and said chambers and having a normal position closing such communications and for equalizing the fluid pressure in said chambers, said valve means being movable from said normal position in one direction to one operating position for connecting one of said chambers to said source of fluid pressure for effecting movement of said piston means in one direction, said valve means being movable from said normal position in the opposite direction to another operating position for connecting said source of fluid pressure to the other of said chambers for moving said piston means in the opposite direction, said valve means having a position adjacent each of said operating positions for equalizing the fluid pressures in said chambers, said valve means further having a position between each of the last named positions and said neutral position for connecting said source of fluid pressure with the chamber other than that connected in the operating position at that side of the neutral position, and means operative in each of the last two positions of said valve means for effecting operation of said locking means.

13. A control mechanism comprising in combination with a source of fluid under pressure, a cylinder, a reciprocatory piston means in said cylinder adapted to be moved in one direction upon supply of fluid under pressure from said source to one side of said piston means when the opposite side of said piston means is in communication with the atmosphere and adapted to be moved in the opposite direction when said opposite side of said piston means is connected with said source of fluid pressure and said one side of said piston means is in communication with the atmosphere, locking means associated with said cylinder and adapted to cooperate with said piston means only in a neutral position thereof substantially mid-way between the ends of said cylinder for securing said piston means against movement, said locking means including means adapted to be operated by fluid under pressure for rendering said locking means effective, and control valve means for controlling communication between the opposite sides of said piston means and said source of fluid pressure and the atmosphere, said control valve means having a normal neutral position for connecting both sides of said piston means with the atmosphere, said valve means being movable in one direction from said neutral position to one operating position for connecting said one side of said piston means with said source of fluid pressure and the said opposite side of said piston means to the atmosphere and being also movable from said neutral position in the opposite direction to another operating position for connecting said opposite side of said piston means to said source of fluid pressure and the first named side of said piston means with the atmosphere, said valve means having another position between said neutral position and each of said operating positions for connecting both of the opposite sides of said piston means with the atmosphere, said valve means further having a position between the last named position at one side of said neutral position and said neutral position for connecting said opposite side of said piston and said locking means with said source of fluid pressure and the first named side of said piston means with the atmosphere and also having at the opposite side of said neutral position and adjacent thereto a position for connecting the said opposite side of said piston means and said locking means with said source of fluid pressure and the said one side of said piston means with the atmosphere.

14. A control mechanism comprising in combination with a source of fluid at a pressure different from atmospheric pressure, a cylinder, a reciprocatory piston therein adapted to be moved in the direction of one end of said cylinder when subject on opposite faces to the differential of pressures between said source and atmosphere and in the opposite direction when said differential is reversed and adapted to remain stationary when the pressures on the opposite faces of said piston are equalized, a first pipe connected to a chamber at one face of said piston means, a second pipe connected to a chamber at the opposite face of said piston means, locking piston means associated with said cylinder and adapted when in communication with said source of fluid pressure through a third pipe to cooperate with said piston means only in a neutral position thereof substantially midway between the ends of said cylinders to secure said piston means against movement, a control valve having a normal position for establishing communication between said first and second pipes for equalizing the fluid pressures on the opposite faces of said piston means, said control valve being movable in one direction from said normal position to an operating position for connecting said first pipe to said source of fluid pressure and said second pipe to the atmosphere, and being movable to another position intermediate said normal position and said operating position for connecting said second pipe with said source of fluid pressure and said first pipe with the atmosphere, said control valve being movable in the opposite direction from said normal position to another operating position for connecting said second pipe with said source of fluid pressure and said first pipe with the atmosphere and being movable to another position intermediate the last named operating position and said normal position for connecting said first pipe with said source of fluid pressure and said second pipe with the atmosphere, said valve means being operative in both positions intermediate said normal and the two operating positions to connect said source of fluid pressure with said third pipe and at all other times to vent said third pipe.

15. A control mechanism comprising in combination with a source of fluid at a pressure different from atmospheric pressure, a cylinder, a reciprocatory piston therein adapted to be moved in the direction of one end of said cylinder when subject on opposite faces to the differential of pressures between said source and atmosphere and in the opposite direction when said differential is reversed and adapted to remain stationary when the pressures on the opposite faces of said piston are equalized, three double check valves, a first pipe connecting a chamber at one side of said piston means to the side outlet of one of said double check valves having its end outlets connected to a second pipe and a third pipe respectively, a fourth pipe connecting a chamber at the opposite face of said piston means to the side outlet of another of said double check valves having its end outlets connected respectively to a fifth pipe and a sixth pipe, locking piston means associated with said cylinder adapted when in communication with said source of fluid pressure to cooperate with said piston means only in a neutral position thereof substantially mid-way between the ends of said cylinder for securing said piston means against movement, said locking piston means being operative upon connecting said source of fluid pressure to a seventh pipe, said seventh pipe being open to the side outlet of the third double check valve having its end outlets connected respectively to an eighth pipe and a ninth pipe, and a control valve device for controlling the communication between said pipes and said source of fluid pressure and the atmosphere respectively, said control valve device comprising a casing having a rotary valve seat to which said second, third, fifth, sixth, eighth and ninth pipes are open, a rotary valve in said casing disposed to turn on said seat for controlling communication between said pipes and the atmosphere and said source of fluid pressure, and means for turning said rotary valve on said seat to the following positions arranged in the order named, a position for connecting said fifth pipe with said source of fluid under pressure and for connecting all other pipes to the atmosphere, a next position for connecting said third and said eighth pipes to said source of fluid pressure and all other pipes with the atmosphere, a next position for connecting all of the pipes with the atmosphere, a next position for connecting said sixth and ninth pipes with said source of fluid pressure and the other pipes with the atmosphere, and still another position for connecting said second pipe with said source of fluid pressure and all other pipes with the atmosphere.

16. A control mechanism comprising in combination with a source of fluid at a pressure different from atmospheric pressure, a cylinder, a reciprocatory piston therein adapted to be moved in the direction of one end of said cylinder when subject on opposite faces to the differential of pressures between said source and atmosphere and in the opposite direction when said differential is reversed and adapted to remain stationary when the pressures on the opposite faces of said piston are equalized, three double check valves, a first pipe connecting a chamber at one side of said piston means to the side outlet of one of said double check valves having its end outlets connected to a second pipe and a third pipe respectively, a fourth pipe connecting a chamber at the opposite face of said piston means to the side outlet of another of said double check valves having its end outlets connected respectively to a fifth pipe and a sixth pipe, locking piston means associated with said cylinder adapted when in communication with said source of fluid pressure to cooperate with said piston means only in a neutral position thereof substantially mid-way between the ends of said cylinder for securing said piston means against movement, said locking piston means being operative upon connecting said source of fluid pressure to a seventh pipe, said seventh pipe being open to the side outlet of the third double check valve having its end outlets connected respectively to an eighth pipe and a ninth pipe, and a control valve device for controlling the communication between said pipes and said source of fluid pressure and the atmosphere respectively, said control valve device comprising a casing having a rotary valve seat to which said second, third, fifth, sixth, eighth and ninth pipes are open, a rotary valve in said casing disposed to turn on said seat for controlling communication between said pipes and the atmosphere and said source of fluid pressure, and means for turning said rotary valve on said seat to the following positions arranged in the order named, a position for connecting said fifth pipe with said source of fluid pressure and all other pipes to the atmosphere, a next position for connecting all of the pipes to the atmosphere, a next position for connecting said third and eighth pipes with said source of fluid pressure and the other pipes to the atmosphere, a next position for connecting all of the pipes to the atmosphere, a next position for connecting said sixth and ninth pipes to said source of fluid pressure and the other pipes to the atmosphere, a next position for connecting all of the pipes to the atmosphere, and a last position for connecting said second pipe with said source of fluid pressure and all other pipes with the atmosphere.

17. A control mechanism comprising in combination with a source of fluid at a pressure different from atmospheric pressure, a cylinder, a reciprocatory piston therein adapted to be moved in the direction of one end of said cylinder when subject on opposite faces to the differential of pressures between said source and atmosphere and in the opposite direction when said differential is reversed and adapted to remain stationary when the pressures on the opposite faces of said piston are equalized, three double check valves, a first pipe connecting a chamber at one face of said piston means to the side outlet of one of said double check valves having its end outlets connected to a second pipe and a third pipe respectively, a fourth pipe connecting a chamber at the opposite face of said piston means to the side outlet of another of said double check valves having its end outlets connected respectively to a fifth pipe and a sixth pipe, locking piston means associated with said cylinder adapted when in communication with said source of fluid pressure to cooperate with said piston means only in a neutral position thereof substantially mid-way between the ends of said cylinder for securing said piston means against movement, said locking piston means being operative upon connecting said source of fluid pressure to a seventh pipe, said seventh pipe being open to the side outlet of the third double check valve having its end outlets connected respectively to an eighth pipe and a ninth pipe, and a control valve device for controlling the communication between said pipes and said source of fluid pressure and the atmosphere respectively, said control valve device comprising a casing having a rotary valve seat to which said second, third, fifth, sixth, eighth and ninth pipes are open, a rotary valve disposed in a valve chamber in said casing to turn on said seat, said valve chamber being in constant communication with the atmosphere, a conduit connecting said source of fluid pressure to the axis of said seat, said rotary valve being a relatively long narrow member extending radially from the axis of said seat to adjacent the periphery thereof and having in the seating face a cavity in constant communication with the conduit open to said source of fluid pressure and thus constantly supplied with fluid under pressure from said source, means for turning said rotary valve to one or another of the following positions arranged in the order named, the said pipe openings at the seat of said valve being so arranged that in a number one position of said valve said fifth pipe is open to said cavity and all other pipes are open to said valve chamber, in a next position all said pipes are open to said chamber, in a third position said cavity is open to said third and eighth pipes and all other pipes are open to said chamber, in a fourth position all of the pipes are open to said chamber, in a fifth position said sixth and ninth pipes are open to said cavity and all other pipes are open to said chamber, in a next position all of the pipes are open to said chamber, and in a final position said cavity is open to said second pipe and all other pipes are open to said chamber.

18. A control valve device comprising a casing having a rotary valve seat, a pipe opening at the axis of said seat, a plurality of pipes opening at said seat around its axis, a relatively long narrow rotary valve mounted on said seat with one end disposed over the axis of said seat and the other end disposed adjacent the periphery of said seat, said valve having in its seating face a longitudinally extending cavity in constant communication with the first named pipe and adapted upon rotation around the axis of said seat to establish communication between the first named pipe and one or another of said plurality of pipes in different positions of said valve on said seat, the pipe or pipes not open to said cavity being open past one side of said valve to said chamber, a shaft journaled in said casing having a connection with said valve adjacent the axis of said seat for turning same and securing same in operative relation to said seat, and means secured to said shaft for turning same.

PHILIP L. CRITTENDEN.
BURTON S. AIKMAN.